(12) United States Patent
Marek

(10) Patent No.: US 10,372,901 B1
(45) Date of Patent: Aug. 6, 2019

(54) HIGH ASSURANCE CERTIFIABLE CRYPTOGRAPHIC SYSTEM

(71) Applicant: Rockwell Collins, Inc., Cedar Rapids, IA (US)

(72) Inventor: James A. Marek, Anamosa, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 260 days.

(21) Appl. No.: 15/654,820

(22) Filed: Jul. 20, 2017

(51) Int. Cl.
G06F 21/00 (2013.01)
G06F 21/51 (2013.01)
G06F 9/455 (2018.01)
G06F 21/57 (2013.01)
G06F 21/53 (2013.01)

(52) U.S. Cl.
CPC .......... G06F 21/51 (2013.01); G06F 9/45558 (2013.01); G06F 21/577 (2013.01); *G06F 21/53* (2013.01)

(58) Field of Classification Search
None
See application file for complete search history.

(56) References Cited

U.S. PATENT DOCUMENTS

| | | | |
|---|---|---|---|
| 2010/0023748 A1* | 1/2010 | Tang | H04L 9/065 713/150 |
| 2012/0226917 A1* | 9/2012 | Wiseman | G06F 21/56 713/193 |
| 2016/0314057 A1* | 10/2016 | De Oliveira | G06F 11/1484 |
| 2018/0173675 A1* | 6/2018 | Tamir | G06F 15/80 |

* cited by examiner

Primary Examiner — Andrew J Steinle
(74) Attorney, Agent, or Firm — Angel N. Gerdzhikov; Donna P. Suchy; Daniel M. Barbieri

(57) ABSTRACT

Segregated cores or virtual processors within a processor establish at least two separate encryption paths via software virtualization. Guest operating systems and encryption applications operate on input data with an enforced level of synchronicity. Output is compared to determine if each encryption path arrives at the same encrypted output. If the outputs are identical, the encrypted data is passed on; if not, an error report is generated. No individual vulnerability may produce a single point of failure to produce erroneously encrypted or unencrypted output.

20 Claims, 3 Drawing Sheets

HIGH ASSURANCE CERTIFIABLE CRYPTOGRAPHIC SYSTEM

BACKGROUND

Modern cryptographic systems are required to be programmable. Software based solutions for encryption are desirable for cost and ease of implementation; commercial off-the-shelf (COTS) processors would offer maximum modularity and re-programmability. Further, modern field programmable gate array (FPGA) technology often is implemented with a single hard core (generally multi-core) processor and a range of programmable gates for additional logic.

However, for high assurance systems, certifying authorities are distrustful of software only solutions. In existing implementations of software systems, plain text and cipher test are simultaneously hosted by the processor.

Consequently, it would be advantageous if an apparatus existed that is suitable for implementing a certifiable encryption system, with redundancies to obviate any single point of failure, with off-the-shelf processors.

SUMMARY

In one aspect, embodiments of the inventive concepts disclosed herein are directed to segregating cores or virtual processors within a processor to establish at least two separate encryption paths via software virtualization. Guest operating systems and encryption applications operate on input data with an enforced level of synchronicity. Output is compared to determine if each encryption path arrives at the same encrypted output. If the outputs are identical, the encrypted data is passed on; if not, an error report is generated. No individual vulnerability may produce a single point of failure to produce erroneously encrypted or unencrypted output.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
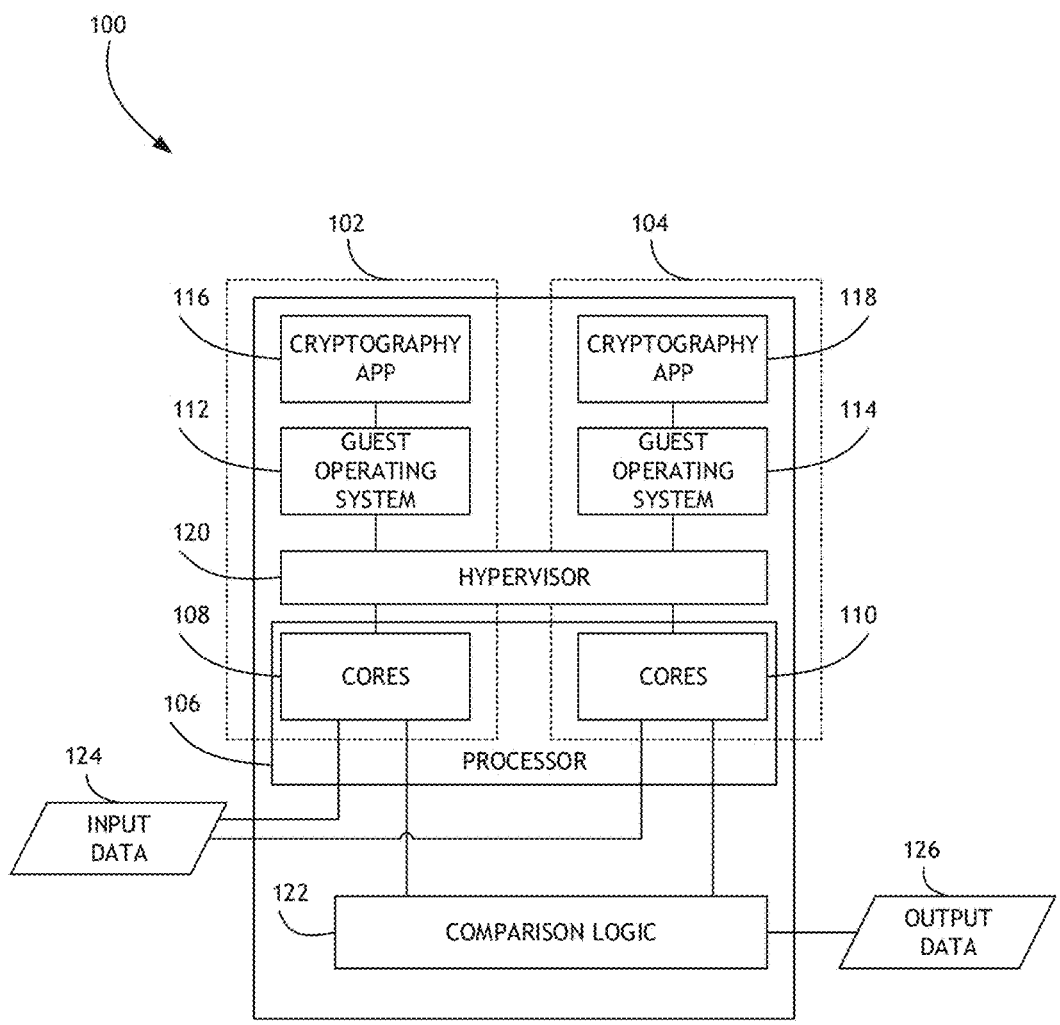
FIG. 1 shows a block diagram of an exemplary embodiment of a system for encrypting input.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for securely and certifiably encrypting input.

Referring to FIG. 1, a block diagram of an exemplary embodiment of a system 100 for encrypting input 124 is shown. The system 100 defines separate encryption paths 102, 104; a processor 106 with multiple cores 108, 110 divides the cores 108, 110 among the separate encryption paths 102, 104. Each set of cores 108, 110 within each separate encryption path 102, 104 instantiates a separate guest operating system 112, 114 which likewise execute separate versions of an encryption application 116, 118.

In at least one embodiment, a hypervisor 120 monitors each guest operating system 112, 114 to enforce synchronicity of the encryption applications 116, 118. Synchronicity may be enforced by monitoring resource allocation requests by each guest operating system 112, 114, either for consistent order of such requests from each guest operating system 112, 114, or substantially contemporaneous timing. Such monitoring may be of varying levels of granularity; for example, in a very granular monitoring system every process executed by one guest operating system 112, 114 must be replicated in the other guest operating system 112, 114 before either process is allowed to proceed. In a less granular monitoring system certain benchmark steps may be defined which each guest operating system 112, 114 must reach before continuing. At a minimum, identical output must be verified before being distributed.

The hypervisor 120 may be statically configured to allocate half of the cores 108, 110 to the first guest operating system 112 and first encryption application 116 while the other half of the cores 108, 110 are allocated to the second guest operating system 114 and encryption application 118. Commercial off-the-shelf processors and hypervisors 120 include virtualization technology to virtualize the guest operating systems 112, 114 or otherwise instantiate multiple virtual machines.

In at least one embodiment, each virtual machine or separate set of processor cores 108, 110 utilize virtualized inputs and outputs assigned to each guest operating system 112, 114.

Virtualization based separation may offer a software base solution with low to no difference from a dual hardware solution; certifiable and with fewer vulnerabilities than a software only solution. Covert channel, TEMPEST, and separation analysis may be performed to ensure that the guest operating systems 112, 114 and encryption applications 116, 118 cannot be simultaneously subverted with higher probability than two independent processors, each hosting the same guest operating system and encryption application with no hypervisor 120.

Comparison logic 122 receives the encrypted output from each encryption path 102, 104. The comparison logic 122 determines that the outputs from each encryption path are identical.

In one exemplary embodiment, the system 100 receives an input 124 to be encrypted. A first set of one or more cores 108 in a processor 106 are assigned to a first encryption path 102 while a second set of one or more different cores 110 are assigned to a second encryption path 104. The first encryption path 102 and second encryption path 104 may represent hypervisor partitions. The first set of cores 108 instantiates a first guest operating system 112 that executes an encryption application 116. Likewise, the second set of cores 110 instantiates a second guest operating system 114 that executes an encryption application 118. The input 124 is distributed identically to each encryption path 102, 104 and identically encrypted by each encryption application 116, 118. The hypervisor monitors each encryption application 116, 118 and generates a fault if the encryption applications 116, 118 diverge beyond some acceptable threshold. Where the encryption applications 116, 118 (and in some embodiment the corresponding guest operating systems 112, 114) remain synchronized, encrypted outputs from each encryption path 102, 104 are delivered to the comparison logic 122 which determines if the outputs are identical. In some embodiments, a voting algorithm may be used compare the outputs and to determine a likely faulty encryption path 102, 104 if such outputs are dissimilar. Further, if such outputs are dissimilar, the output 126 of the system may comprise a fault report. If the outputs are identical, the system may determine that the encryption was successful and the output 126 of the system is the encrypted data.

Encrypted data is only output 126 if the encryption paths 102, 104 operated in synchronicity within a defined threshold and the outputs of the encryption paths 102, 104 are identical. System 100 vulnerabilities can generally not be exploited across more than one encryption path 102, 104 at a time; therefore any attempt to exploit such vulnerabilities will only result in de-synchronization or non-identical outputs, which will cause the system to generate a fault report for output 126. No unencrypted data or wrongly encrypted data will be passed through the system 100.

In at least one embodiment, each element of each encryption path 102, 104 is substantially identical such the synchronization may be highly granular. Alternatively, elements may be dissimilar. For example, each encryption path 102, 104 may utilize a different embodiment of guest operating system 112, 114 or encryption application 116, 118, or both, to further limit the risk of system vulnerabilities as different guest operation systems 112, 114 and encryption applications 116, 118 may have different vulnerabilities that cannot be exploited in unison.

In at least one embodiment, the hypervisor 122 segregates system resources such as memory so that blocks of memory addresses are only available to one guest operating system 112, 114. Segregating resources further reduces risks associated with any system vulnerabilities.

In at least one embodiment, the comparison logic 122 comprises a field programmable gate array or application specific integrated circuit. In at least one embodiment, the processor 106 is implemented as a field programmable gate array.

Figure 2:
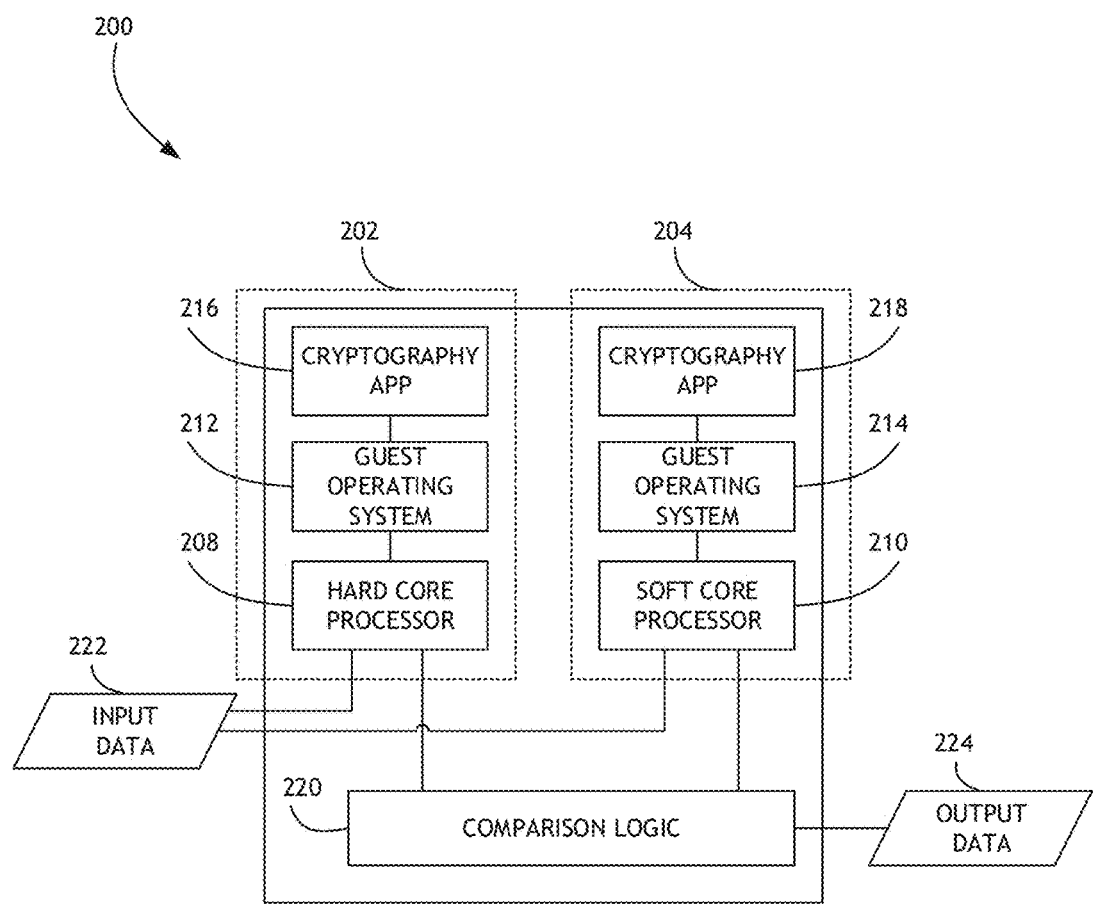
FIG. 2 shows a block diagram of an exemplary embodiment of a system for encrypting input.

Referring to FIG. 2, a block diagram of an exemplary embodiment of a system 200 for encrypting input 222 is shown. The system 200 defines separate encryption paths 202, 204; a first encryption path 202 includes a hard core processor 208 implemented as an integrated circuit while a second encryption path 204 includes a soft core processor 210 implemented as a field programmable gate array. Each processor 208, 210 within each separate encryption path 202, 204 instantiates a separate guest operating system 212, 214 which likewise execute separate versions of an encryption application 216, 218.

Synchronicity may be enforced by monitoring resource allocation requests by each guest operating system 212, 214, either for consistent order of such requests from each guest operating system 212, 214, or substantially contemporaneous timing. Such monitoring may be of varying levels of granularity; for example, in a very granular monitoring system every process executed by one guest operating system 212, 214 must be replicated in the other guest operating system 212, 214 before either process is allowed to proceed. In a less granular monitoring system certain benchmark steps may be defined which each guest operating system 212, 214 must reach before continuing. At a minimum, identical output must be verified before being distributed. Synchronicity is maintained via cross-communication between the guest operating systems 212, 214.

Comparison logic 220 receives the encrypted output from each encryption path 202, 204. The comparison logic 220 determines that the outputs from each encryption path are identical.

In one exemplary embodiment, the system 200 receives an input 222 to be encrypted. A first processor 208 is assigned to a first encryption path 202 while a second processor 210 is assigned to a second encryption path 204. The first processor 208 instantiates a first guest operating system 212 that executes an encryption application 216. Likewise, the second processor 210 instantiates a second guest operating system 214 that executes an encryption application 218. The input 222 is distributed identically to each encryption path 202, 204 and identically encrypted by each encryption application 216, 218. Where the encryption applications 216, 218 (and in some embodiment the corresponding guest operating systems 212, 214) remain synchronized, encrypted outputs from each encryption path 202, 204 are delivered to the comparison logic 220 which determines if the outputs are identical. In some embodiments, a voting algorithm may be used compare the outputs and to determine a likely faulty encryption path 202, 204 if such outputs are dissimilar. Further, if such outputs are dissimilar, the output 224 of the system may comprise a fault report. If the outputs are identical, the system may determine that the encryption was successful and the output 224 of the system is the encrypted data.

Encrypted data is only output 224 if the encryption paths 202, 204 operated in synchronicity within a defined threshold and the outputs of the encryption paths 202, 204 are identical. System 200 vulnerabilities can generally not be exploited across more than one encryption path 202, 204 at a time; therefore any attempt to exploit such vulnerabilities will only result in de-synchronization or non-identical outputs, which will cause the system to generate a fault report for output 224. No unencrypted data or wrongly encrypted data will be passed through the system 200.

In at least one embodiment, each element of each encryption path 202, 204 is substantially identical such the synchronization may be highly granular. Alternatively, elements may be dissimilar. For example, each encryption path 202, 204 may utilize a different embodiment of guest operating system 212, 214 or encryption application 216, 218, or both, to further limit the risk of system vulnerabilities as different guest operation systems 212, 214 and encryption applications 216, 218 may have different vulnerabilities that cannot be exploited in unison.

In at least one embodiment, the comparison logic 220 comprises a field programmable gate array or application specific integrated circuit.

In at least one embodiment, one hard core processor 208 and one soft core processor 210 within the field programmable gate array implement a dual voted comparison logic 220 that still works in a single field programmable gate array that only includes one hard core processor 208.

Figure 3:
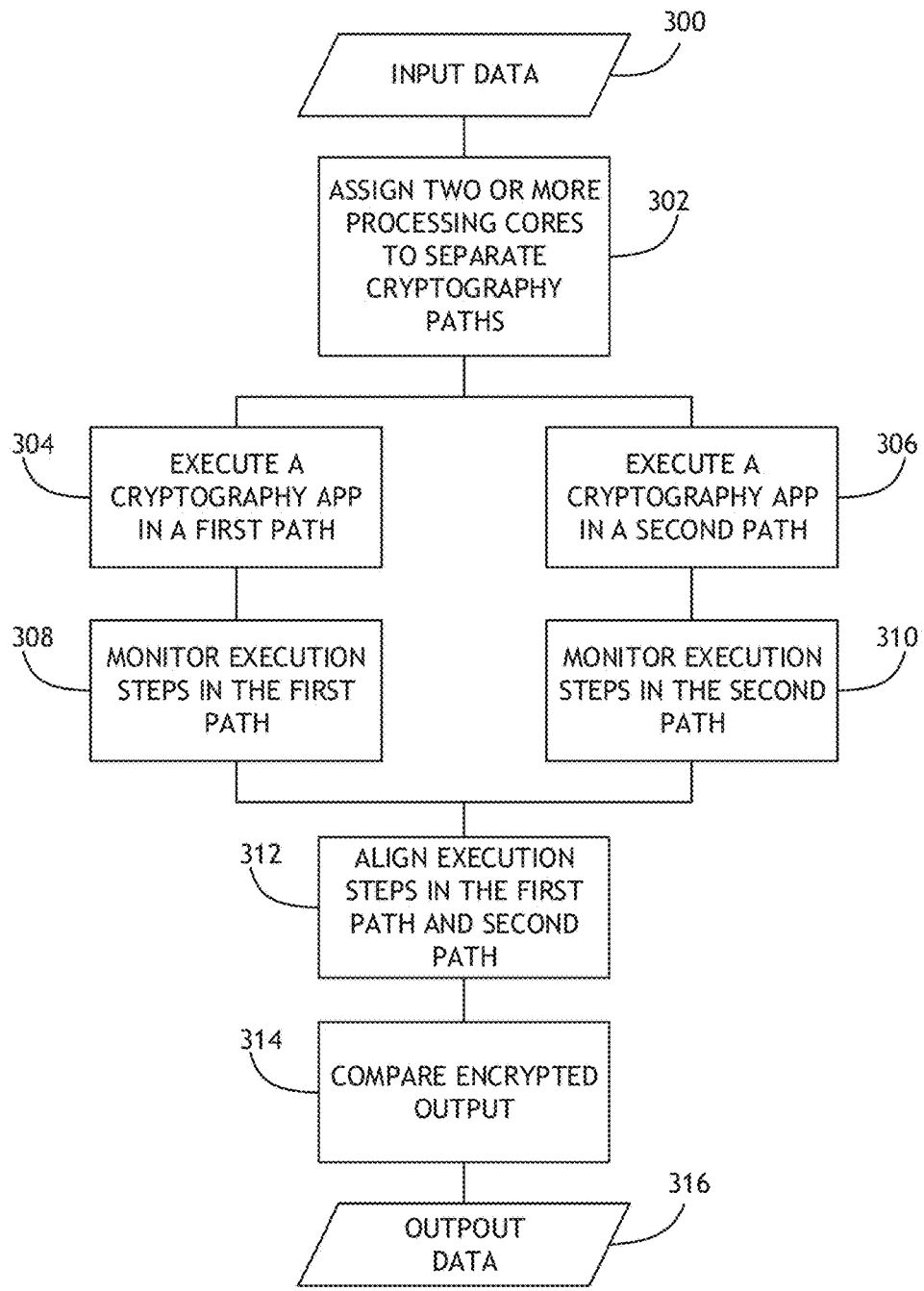
FIG. 3 shows a flow chart of an exemplary embodiment of a method for encrypting input.

Referring to FIG. 3, a flow chart of an exemplary embodiment of a system for encrypting input 300 is shown. The system assigns 302 two or more processing cores to separate cryptography paths. Alternatively, the system may assign 302 a hard core processor to one cryptography path and a soft core processor to a second cryptography path.

Systems and methods according to the inventive concepts disclosed herein may encrypt data with high assurance (e.g. NSA Type 1) while also utilizing commercial off-the-shelf field programmable gate arrays and embedded commercial off-the-shelf processors as well as commercial off-the-shelf processors combined with commercial off-the-shelf field programmable gate arrays where the commercial off-the-shelf processor hosts software cryptographic algorithms rather than hosting them in firmware.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
at least one processor, comprising a first set of one or more processing cores and a second set of one or more processing cores, in data communication with a memory storing processor executable code;
a hypervisor in data communication with the processor;
wherein the processor executable code configures the at least one processor to:
instantiate separate guest operating systems on each of the first set of processing cores and the second set of processing cores;
execute separate encryption applications within each of the separate guest operating systems;
monitor execution of each separate encryption application for a threshold level of synchronicity via the hypervisor;
compare a first encrypted output from the first set of processing cores to a second encrypted output from the second set of processing cores; and
output the encrypted output when the encrypted output from the first set of processing cores and the second set of processing cores are identical.

2. The computer apparatus of claim 1, wherein the at least one processor is further configured to output a fault report when the encrypted output from the first set of processing cores and the second set of processing cores are not identical.

3. The computer apparatus of claim 1, wherein the at least one processor is further configured to virtualize input and output ports to each of the first set of processing cores and the second set of processing cores.

4. The computer apparatus of claim 1, wherein the at least one processor is further configured to perform covert channel analysis to certify a data encryption system.

5. The computer apparatus of claim 1, wherein the at least one processor is further configured to halt execution of one of the encryption applications when the threshold level of synchronicity is not met.

6. The computer apparatus of claim 1, wherein the separate guest operating systems are dissimilar.

7. The computer apparatus of claim 1, wherein the separate encryption applications are dissimilar.

8. A method for encrypting data comprising:
instantiating separate guest operating systems on each of a first set of processing cores and a second set of processing cores;
executing separate encryption applications within each of the separate guest operating systems;
monitoring execution of each separate encryption application for a threshold level of synchronicity;
comparing a first encrypted output from the first set of processing cores to a second encrypted output from the second set of processing cores; and
outputting the encrypted output when the encrypted output from the first set of processing cores and the second set of processing cores are identical.

9. The method of claim 8, further comprising outputting a fault report when the encrypted output from the first set of processing cores and the second set of processing cores are not identical.

10. The method of claim 8, further comprising virtualizing input and output ports to each of the first set of processing cores and the second set of processing cores.

11. The method of claim 8, further comprising performing covert channel analysis to certify a data encryption system.

12. The method of claim 8, further comprising halting execution of one of the encryption applications when the threshold level of synchronicity is not met.

13. The method of claim 8, wherein the separate guest operating systems are dissimilar.

14. The method of claim 8, wherein the separate encryption applications are dissimilar.

15. A cryptography system comprising:
at least one processor configured to:
  instantiate a virtualized soft core processor;
  instantiate a first guest operating system on the at least one processor;
  instantiate a second guest operating system on the virtualized soft core processor;
  execute a first encryption application on the first guest operating system;
  execute a second encryption application on the second guest operating system;
  monitor execution steps of the first encryption application compared to the second encryption application;
  compare a first encrypted output from the first encryption application to a second encrypted output from the second encryption application;
  output an encrypted output when the first encrypted output and the second encrypted output are identical.

16. The cryptography system of claim 1, wherein the at least one processor is further configured to output a fault report when the encrypted output from the first encryption application and the second encryption application are not identical.

17. The cryptography system of claim 1, wherein the at least one processor is further configured to virtualize input and output ports to each of the first guest operating system and the second guest operating system.

18. The cryptography system of claim 1, wherein the at least one processor is further configured to halt execution of one of the encryption applications when the threshold level of synchronicity is not met.

19. The cryptography system of claim 1, wherein the separate guest operating systems are dissimilar.

20. The cryptography system of claim 1, wherein the separate encryption applications are dissimilar.

* * * * *